(12) United States Patent
Reisteter et al.

(10) Patent No.: US 12,169,455 B2
(45) Date of Patent: Dec. 17, 2024

(54) WRITE-BEHIND OPTIMIZATION OF COVERING CACHE

(71) Applicant: Microsoft Technology Licensing, LLC, Redmond, WA (US)

(72) Inventors: Krystyna Ewa Reisteter, Kirkland, WA (US); Cristian Diaconu, Kirkland, WA (US); Rogério Ramos, Redmond, WA (US); Sarika R. Iyer, San Ramon, CA (US); Siddharth Deepak Mehta, Kirkland, WA (US); Huanhui Hu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/311,699

(22) Filed: May 3, 2023

(65) Prior Publication Data

US 2023/0297510 A1    Sep. 21, 2023

Related U.S. Application Data

(63) Continuation of application No. 17/359,087, filed on Jun. 25, 2021, now Pat. No. 11,681,631.

(51) Int. Cl.
*G06F 12/08* (2016.01)
*G06F 3/06* (2006.01)
(Continued)

(52) U.S. Cl.
CPC ........ *G06F 12/0882* (2013.01); *G06F 3/0604* (2013.01); *G06F 3/0656* (2013.01);
(Continued)

(58) Field of Classification Search
CPC .... G06F 3/0604; G06F 3/0656; G06F 3/0679; G06F 12/0246; G06F 12/0871;
(Continued)

(56) References Cited

U.S. PATENT DOCUMENTS

| | | | |
|---|---|---|---|
| 2003/0061537 A1* | 3/2003 | Cha ..................... | G06F 11/2094 714/E11.13 |
| 2008/0228835 A1* | 9/2008 | Lashley ............. | G06F 11/2046 |

* cited by examiner

*Primary Examiner* — Hua J Song
(74) *Attorney, Agent, or Firm* — Weaver IP L.L.C.

(57) ABSTRACT

Data base performance is improved using write-behind optimization of covering cache. Non-volatile memory data cache includes a full copy of stored data file(s). Data cache and storage writes, checkpoints, and recovery may be decoupled (e.g., with separate writes, checkpoints and recoveries). A covering data cache supports improved performance by supporting database operation during storage delays or outages and/or by supporting reduced I/O operations using aggregate writes of contiguous data pages (e.g., clean and dirty pages) to stored data file(s). Aggregate writes reduce data file fragmentation and reduce the cost of snapshots. Performing write-behind operations in a background process with optimistic concurrency control may support improved database performance, for example, by not interfering with write operations to data cache. Data cache may store (e.g., in metadata) data cache checkpoint information and storage checkpoint information. A stored data file may store storage checkpoint information (e.g., in a file header).

20 Claims, 8 Drawing Sheets

(51) Int. Cl.
*G06F 12/02* (2006.01)
*G06F 12/0871* (2016.01)
*G06F 12/0882* (2016.01)

(52) U.S. Cl.
CPC ........ *G06F 3/0679* (2013.01); *G06F 12/0246* (2013.01); *G06F 12/0871* (2013.01)

(58) Field of Classification Search
CPC ............. G06F 12/0882; G06F 12/0868; G06F 2212/1041; G06F 2212/154; G06F 2212/163; G06F 2212/222; G06F 16/2358; G06F 16/24552
USPC ........................................................ 711/141
See application file for complete search history.

WRITE-BEHIND OPTIMIZATION OF COVERING CACHE

CROSS-REFERENCE TO RELATED APPLICATION(S)

The present application is a continuation of U.S. patent application Ser. No. 17/359,087, entitled "WRITE-BEHIND OPTIMIZATION OF COVERING CACHE," filed on Jun. 25, 2021, the entirety of which is incorporated by reference herein.

BACKGROUND

A database is an organized collection of data, generally stored and accessed electronically from a computer system. Users at computing devices may read data from a database, as well as write data to the database and modify data in the database through the use of queries. Queries are formal statements of information needs, such as a search string applied to a table in a database. A database management system (DBMS) includes program code that interacts with end users, applications, and the database itself to capture and analyze the data. The DBMS additionally encompasses the core facilities provided to administer the database. The sum total of the database, the DBMS and the associated applications may be referred to as a "database system". The term "database" is also often used to loosely refer to any of the DBMS, the database system or an application associated with the database.

SQL (structured query language) is a domain-specific language used in programming and designed for managing data held in a relational database management system (RDBMS), or for stream processing in a relational data stream management system (RDSMS). SQL is particularly useful in handling structured data, which is data incorporating relations among entities and variables. A query plan (or query execution plan) is a sequence of steps used to access data in a SQL RDBMS according to a query.

A database, such as an SQL database, may need to be scaled as the number of clients, number of read and/or write queries, amount of data, number of query servers, and/or number of storage devices increases. Such scaling increases costs and may not ultimately be able to support demands on the database adequately. Large numbers of transactions to serve, and the maintenance of all copies of data in the database on many devices, may exhaust the memory, processing threads, and/or input/output (I/O) capabilities of database system devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for write-behind optimization of a covering cache (e.g., in a database). Non-volatile (NV) data cache (e.g., resilient solid state drive (SSD) cache) may include a full copy of one or more data files. Such data cache supports improved performance by supporting database operation during storage delays or outages and by supporting reduced I/O operations using aggregate (e.g., fixed or variable block size) writes of contiguous data pages (e.g., clean and dirty pages) to one or more data files in data storage. In some implementations (e.g., in the context of append-only storage), aggregate writes reduce data file fragmentation and reduce the cost of storage operations such as snapshots and file copies. Performing write-behind operations in a background process with optimistic concurrency control (e.g., using bitmaps) enables improved database performance, for example, by not interfering with write operations to data cache.

One or more covering caches (e.g., in one or more data or page servers) for one or more underlying database storage files (e.g., binary large objects (BLOBs)) maintain a dirty page bitmap (e.g., in an in-memory buffer) for changed data (e.g., data pages) in the covering cache based on write I/O operations (e.g., updating cached data pages based on log records in transaction logs). A secondary (e.g., background) process may use the dirty bits tracking to (e.g., asynchronously) detect the changed data pages, read the changed data from the covering cache and write the changed data to the underlying database storage files (e.g., without interrupting in-flight write operations to the covering cache). Read-write concurrency (e.g., data cache writes and background process reads of the data cache to update a stored data file) may use latches or optimistic concurrency control (e.g., using write and read bitmaps to determine when to retry a read operation that occurred concurrent with a write operation). The secondary process performs aggregate block writes (e.g., including clean and dirty data pages), for example, to reduce fragmentation of underlying database storage files.

Database data cache and storage writes, checkpoints and recovery may be decoupled. Data (e.g., page) servers with (e.g., persisted) data cache resiliently operate a database through remote storage unavailability. Data cache may store (e.g., in metadata) data cache checkpoint information and storage checkpoint information, such as indicating a most recently applied transaction log sequence number (LSN) for data cache and storage. A storage file may additionally store storage checkpoint information. The background process may store the data cache checkpoint information (e.g., including the most recently applied LSN) in storage checkpoint information, for example, based on completion of writing the changed data pages to the underlying database storage file(s). A data server recovery may apply logs following a most recently applied log denoted in data cache checkpoint metadata. A storage recovery may read logs between the data cache LSN and the storage LSN to restore a dirty page bitmap for pages changed by log records in the logs.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
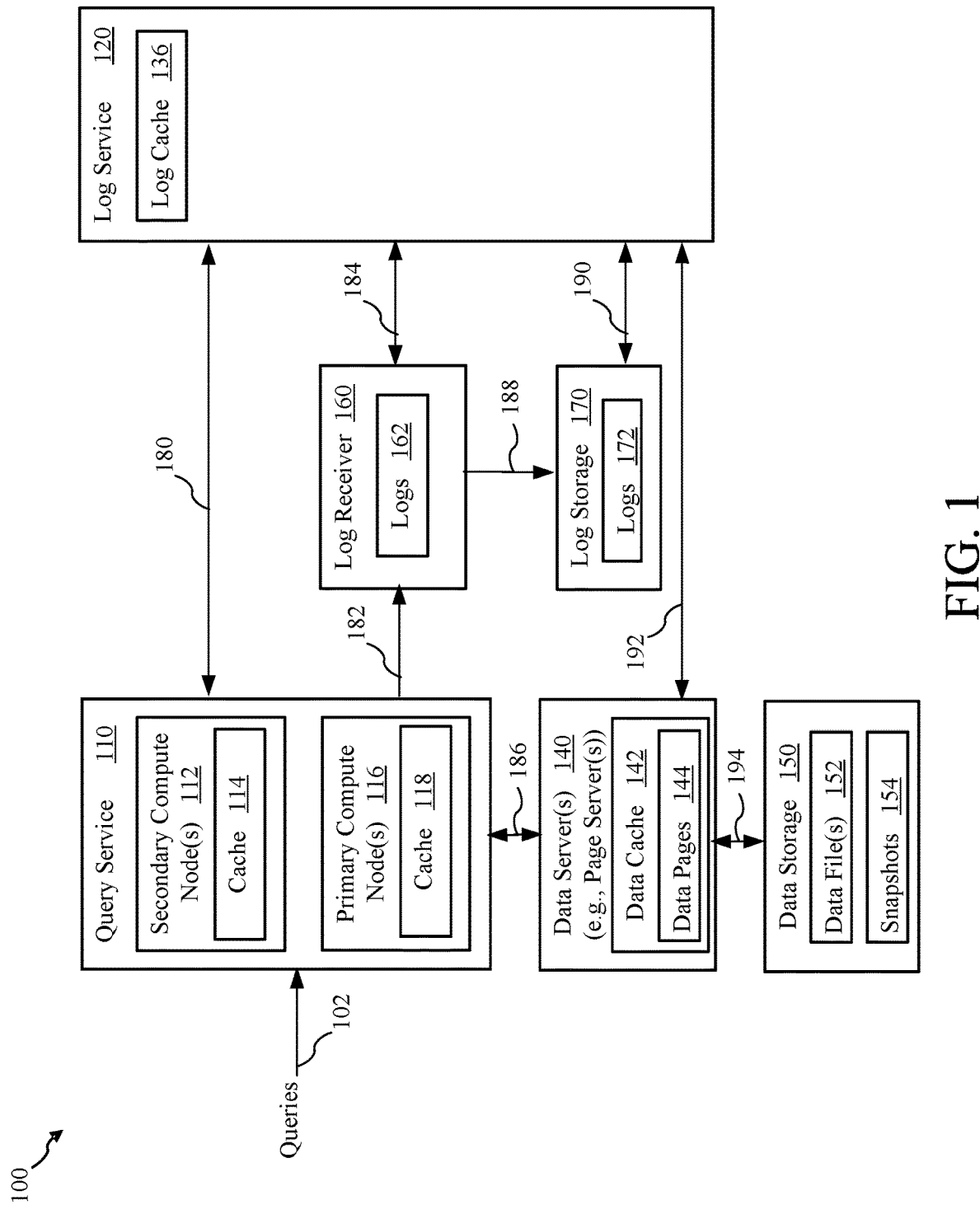
FIG. 1 shows a block diagram of a database system that includes write-behind optimization for covering cache in a database, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Further detail on embodiments is provided in this section. Example database system environments in which embodiments may be implemented are described as follows, followed by further description of more specific embodiments.

A. Example Database System Embodiments

A database (e.g., an SQL database, such as Microsoft® Azure® SQL Database) may be used in a variety of computing environments, such as a cloud environment. A database may be implemented with a database engine. A database engine may have one or more engine components, such as a query engine and a storage engine. A database engine and/or components therein (e.g., query and/or storage engines) may have front-end (FE) and back-end (BE) components. Customer/Client users and/or applications may interact with one or more FE components (e.g., a query engine), but may be unaware of one or more BE components (e.g., a storage engine). A query engine (e.g., an SQL engine in an SQL server) may be a portion of a database engine that executes query logic. A query engine may process queries and determine behaviors. Queries may read data and/or write data (e.g., add, change, delete data). A query engine may evaluate a query, for example, to determine query compatibility with other SQL implementations and/or behaviors.

There may be multiple copies/replicas of data. For example, there may be multiple people using different devices to review and/or edit the same data or the same files. Transaction logs may be generated and used to maintain records of changes to data in various data replicas. Clients (e.g., query servers and data servers) may request and/or receive (e.g., be served with) transaction logs to maintain their respective copies of data. An SQL database may serve clients with transaction logs (e.g., in response to a configuration or a request to provide logs). Serving logs may be constrained by available resources (e.g., a resource constrained service).

A database engine (e.g., an SQL database engine) may be implemented as multiple services (e.g., microservices). The multiple services may include, for example, a compute service, a log service, and a storage service.

A compute service may be an FE that a customer may see and interact with. A compute service may be implemented as one or more compute nodes in a query engine. Compute nodes may be implemented as servers (e.g., SQL servers), for example, with or without local data files or log files. Customer/client computing applications and users may interact with compute nodes as a query server. Compute nodes may provide query execution logic. Compute nodes may include primary and secondary compute nodes. Queries may change (e.g., update) data (e.g., via a primary compute node) or may perform read-only transactions (e.g., via a secondary compute node). Changes to data may be logged and promulgated (e.g., by a log service).

A storage service in a storage engine may be implemented with data servers. Data servers that manage "pages" of data may be referred to as page servers. Page servers may be implemented as a scalable service, e.g., more page servers for a large amount of data and fewer page servers for less data. Each of multiple page servers in a storage engine may manage one or more data pages (e.g., a configured or defined set of data pages). For example, a page server may manage 128 GB, 256 GB, 512 GB or 1 TB of data pages.

A log service may serve clients (e.g., query servers and data servers) with transaction logs (e.g., in response to a configuration or a request from transaction log clients such as replica compute nodes and data servers to provide logs). Log service may serve logs in the form of log blocks. A log block may be a unit of memory suitable for transferring over a network (e.g., 60 kilobytes). A (e.g., each) log block may have an identity. An identity of a log block may be its position in a logical stream of log blocks. A log service may manage the flow of transaction log data. A log service may support propagation of logged updates to data to the cached and stored replicas of each changed page. A log service may support persistent storage of logged updates, e.g., for future reference or use. A log service may be internal or external to a database.

Database services (e.g., a service external to a database such as an external log service) may interact to provide an overall database service. In a compute service, one or more compute nodes may process queries, which may include engaging in one or more transactions in response to each query. A compute node (e.g., a primary compute node) may write transaction log records to a log file receiver (e.g., a landing zone), which may be part of a log service. A compute node (e.g., a primary compute node) may interact with a storage service by fetching data pages from page servers if the data pages are not found in the local data cache or in a resilient buffer pool extension (RBPEX). A primary compute node (e.g., instance) may write log records (e.g., directly) to storage managed by a log service. The log service may retrieve log records from a log file receiver and make the logs available to page servers and secondary compute nodes. The log service may (e.g., also) offload log records to long-term storage (LTS) to support point-in-time restore (PITR).

Methods, systems and computer program products are provided for write-behind optimization of covering cache (e.g., in a database). Write-behind optimization of storage-covering cache may improve database performance. Non-volatile (NV) data cache (e.g., resilient SSD cache) may include a full copy of one or more data files. Data cache may (e.g., therefore) support improved performance with reduced I/O operations using aggregate (e.g., fixed or variable block size) writes of contiguous data pages (e.g., clean and dirty pages) to one or more data files in data storage. Aggregate writes to storage may reduce data file fragmentation and reduce the cost of snapshots. In contrast, in-memory cache (e.g., buffer pool) may not include a full copy of one or more data files, which may not support I/O reduction with large writes of contiguous data pages to one or more data files in data storage. Performing write-behind operations in a background process with optimistic concurrency control (e.g., using bitmaps) may support improved database performance, for example, by not interfering with write operations to data cache.

One or more covering caches (e.g., in one or more data or page servers) for one or more underlying database storage files (e.g., binary large objects (BLOBs)) may maintain a dirty page bitmap (e.g., in an in-memory buffer) for changed data (e.g., data pages) in the covering cache based on write I/O operations (e.g., updating cached data pages based on log records in transaction logs). A secondary (e.g., background process) may use the dirty bits tracking to (e.g., asynchronously) detect the changed data pages, read the changed data from the covering cache and write the changed data to the underlying database storage files (e.g., without interrupting in-flight write operations to the covering cache). Read-write concurrency (e.g., data cache writes and background process reads of the data cache to update a stored data file) may use latches or optimistic concurrency control (e.g., using write and read bitmaps to determine when to retry a read operation that occurred concurrent with a write operation). The secondary process may perform aggregate block writes (e.g., including clean and dirty data pages), for example, to reduce fragmentation of underlying database storage files.

Database data cache and storage writes, checkpoints and recovery may be decoupled. Data (e.g., page) servers with (e.g., persisted) data cache may resiliently operate a database through (e.g., remote) storage unavailability (e.g., due to delays or outages). Data cache may store (e.g., in metadata) data cache checkpoint information and storage checkpoint information (e.g., indicating a most recently applied transaction log sequence number (LSN) for data cache and storage). A storage file may (e.g., also) store storage checkpoint information. The background process may store the data cache checkpoint information (e.g., including the most recently applied LSN) in storage checkpoint information, for example, based on completion of writing the changed data pages to the underlying database storage file(s). A data (e.g., page) server recovery may apply logs following a most recently applied log denoted in data cache checkpoint metadata. A storage recovery may read logs between the data cache LSN and the storage LSN to restore a dirty page bitmap for pages changed by log records in the logs.

Such embodiments may be implemented in a variety of systems and environments. For instance, FIG. 1 shows a block diagram of a database system 100 that includes write-behind optimization for covering cache in a database, according to an example embodiment. As shown in FIG. 1, database system 100 includes a query service 110, a log service 120, data server(s) (e.g., page server(s)) 140, data storage 150, log receiver 160 and log storage 170. Example database system 100 presents one of many possible example implementations. Example database system 100 may comprise any number of computing devices (e.g., including servers), such as example components illustrated in FIG. 1 and other additional or alternative devices not expressly illustrated. Other types of computing environments are also contemplated. The features of database system 100 are described in detail as follows.

In FIG. 1, query service 110, log service 120, data server(s) (e.g., page server(s)) 140, data storage 150, log receiver 160 and log storage 170 are shown as communicatively coupled (e.g., interconnected) by connections (shown as arrowed lines). Such connections may include one or more networks (e.g., network(s)). Network(s) may include one or more of any of a local area network (LAN), a wide area network (WAN), a personal area network (PAN), a combination of communication networks, such as the Internet, and/or a virtual network. In an implementation, any one or more of query service 110, log service 120, data server(s) (e.g., page server(s)) 140, data storage 150, log receiver 160 and log storage 170 may communicate (e.g., via network(s)) via one or more application programming interfaces (APIs), and/or according to other interfaces and/or techniques. Query service 110, log service 120, data server(s) (e.g., page server(s)) 140, data storage 150, log receiver 160 and log storage 170 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Query service 110 may comprise one or more virtual machines, storage devices, servers, operating systems, applications, services, local processes, remote machines, web services, etc. that may be executed, hosted, and/or stored therein or via one or more other computing devices via network(s). Query service 110 may represent (e.g., may be implemented by) any number of computing devices (e.g., query servers, such as primary and secondary compute nodes 116, 112). Query service 110 may be implemented by any type of stationary or mobile computing devices, including a mobile computer or mobile computing device, or a stationary computing device such as a desktop computer or PC (personal computer), or a server.

Customers may interact with query service 110, which may provide a front end (FE) of a database. As shown in FIG. 1, query service 110 includes one or more primary compute nodes 116 and one or more secondary compute nodes 112. Primary compute node(s) 116 and secondary compute node(s) 112 may each comprise any type of computing device. Primary and secondary compute node(s) 116, 112 may run SQL server or another database server type. An SQL server process may allocate cache for a process. There may be multiple levels of cache, e.g., in memory and on disk.

Primary compute node(s) 116 and secondary compute node(s) 112 may receive and process database queries 102 from one or more client computing devices (not shown). Secondary compute node(s) 112 may be replicas of primary compute node(s) 116. Database queries 102 may read data or write (e.g., change) data. Data may be stored in data server(s) (e.g., page server(s)) 140. Primary compute node(s) 116 and secondary compute node(s) 112 may request and receive data 186 (e.g., data pages 144) from data server(s) (e.g., page server(s)) 140. Primary compute node(s) 116 and secondary compute node(s) 112 may comprise cache memory/storage (e.g., cache 114, cache 118) to cache copies of portions (e.g., data pages 144) of data stored in data server(s) (e.g., page server(s)) 140. Compute nodes may have different cache contents. Cache 114, 118 (e.g., in memory and/or on disk) may be least recently used (LRU) cache to evict cached data and/or logs. Cache in disk may be resilient buffer pool extension (RBPEX) cache (e.g., solid state drive (SSD)). Cache size may be selected or determined based on (e.g., proportional to) the size of the compute node. A customer may choose the size of a compute node (e.g., number of virtual CPU cores).

A customer may choose to connect to primary compute node or a (e.g., specific) secondary compute node. A query on a secondary may touch on different pages than pages touched by a query on the primary or another secondary compute node. Primary compute node(s) 116 may process read and write queries while secondary compute node(s) 112 may process read queries. Queries may include instructions to make one or more changes to a database. A change may be implemented in a primary database. The change may be logged and promulgated to replicate a change (e.g., copy the change) to secondary databases. Primary compute node(s) 116 may generate logs 182 to identify and preserve records of changes to data by write queries. Logs may be provided to log receiver 160. Secondary compute node(s) 112 may access (e.g., request and receive) logs 180 from log service 120 to update cached copies of data pages 144.

Primary and secondary compute node(s) 116, 112 may outsource data to data server(s) 140 (e.g., as opposed to storing data locally) and logs to log storage 170 (e.g., as opposed to storing logs locally). Primary and secondary compute node(s) 116, 112 may keep small subset of data in cache while data server(s) 140 may store all data. Primary and secondary compute node(s) 116, 112 may search for data in compute node cache 118, 114 before searching for the data in data server(s) 140.

Data server(s) 140 may include one or more data servers. Data server(s) 140 may include one or more replicas (e.g., for each of one or more data servers). Data server(s) 140 may comprise one or more virtual machines, storage devices, servers, operating systems, applications, services, local processes, remote machines, web services, etc. that may be executed, hosted, and/or stored therein or via one or more other computing devices (e.g., via network(s)). Data server(s) 140 may represent any number of computing devices. Data server(s) 140 may each be any type of stationary or mobile computing device, or a stationary computing device such as a desktop computer or PC (personal computer), or a server.

Data server(s) 140 may include data cache 142. Data cache 142 may be non-volatile memory (NVM) (e.g., SSD, persistent memory (PMEM)). In some examples, data cache 142 may be fully covering local NVM cache (e.g., RBPEX). Data server(s) 140 may store and manage database data in data cache 142 in the form of data pages 144. Data (e.g., pages) stored by data server(s) 140 may or may not overlap with data (e.g., pages) stored by one or more other data server(s) 140. Data server(s) 140 may receive requests for and serve data 186 to primary compute node(s) 116 and secondary compute node(s) 112. Data server(s) 140 may request and receive logs 192 from log service 120 to maintain (e.g., update) data pages 144.

Data server(s) 140 may be page servers (e.g., in backend (BE) database services). The number of page servers may be scalable. The number of data (e.g., page) servers 140 may be proportional to the amount of data, e.g., may increase or decrease with the amount of data (e.g., a large database may have more page servers than a small database). The number of data server(s) 140 may increase with the amount of data. A database system may detect that it is low on space and provision more page servers to house/store the extra data. Data server(s) 140 may be located in one or more data centers (e.g., in a region of datacenters). Data server(s) 140 may (e.g., be used to) distribute customer data (e.g., rather than maintain customer data in a centralized location). Data distribution may support database scaling. Primary and secondary compute node(s) 112, 116 may use page servers as virtualized page stores. Data pages may be externalized to computes using data server(s) 140 (e.g., page servers). Data server(s) 140 may receive logs. Data server(s) 140 keep slices of customer data up to date by replaying change logs.

Data server(s) 140 may use data cache 142 to cache data pages 144. For example, data server(s) 140 may cache (e.g., an entire slice of) data pages while compute nodes 116, 112 may cache a subset of the data service slice. For example, a customer may have 10 TB of data, which may be sliced into 128 GB chunks. Each of several data servers 140 may have a 128 GB chunk data slice (e.g., represented as data pages 144). One or more data files (e.g., BLOBs) representing the 10 TB of data may be stored in data storage 150, which may correspond to the 128 GB data slice (e.g., data pages 144) stored by a data server 140, for example, so that a copy of externally stored data is available on a locally attached disk for each data server 140 in the form of a respective/corresponding 128 GB slice of data.

Data storage 150 may provide long term storage for data. Data storage 150 may be, for example, a storage service external to a database service (e.g., Microsoft® Azure® storage external to SQL server). Storage 150 may be append-only, for example, with metadata describing the physical file layout. Data storage 150 may store, for example, data file(s) 152 and snapshots 154. Data file(s) 152 may be BLOBs.

In some examples, a database engine may maintain data files 152 in storage 150 through in-place updates of one or more contiguous (e.g., 8 KB) pages. Small in-place writes to storage 150 may lead to fragmentation of data file(s) 152, which may impact the performance of subsequent reads and/or the cost of storage operations, such as snapshots 154. Also, concurrent writes to data cache 142 and data storage 150 (e.g., as shown by example in FIG. 2) may subject a database to latency and unreliability.

Write-behind (WB) may use data cache 142 (e.g., fully covering local SSD cache) to optimize the write I/O pattern for storage 150, which may enhance resiliency to transient unavailability of storage 150. Write-behind may write I/O updates (e.g., only) to data cache 142. Higher layers of the database engine may be shielded from the latency and unreliability of data storage 150 (e.g., and remote I/O), which may improve the performance of write workloads. A (e.g., dedicated) WB (e.g., background) process (e.g., thread) may (e.g., asynchronously) maintain data file(s) 152, for example, by propagating changes from data cache 142 to data storage 150. A WB process may use a smaller number of (e.g., but larger size) I/O requests. A WB process may be performed transparently, with minimal impact on other components of a database engine.

For example, a WB process (e.g., background thread) may update data file(s) 152 in (e.g., configurable) fixed blocks (e.g., 1 MB fragments, which may include many 8 kb data pages). A WB process may read (e.g., all) fragments in data cache 142 that have been updated since a previous write (e.g., at least one data page updated among many data pages in a block/fragment) and flush the fragment(s), e.g., via data operations 194, to data storage 150 (e.g., using 1 MB write I/O requests). A reduction in the number of write I/O requests to data storage 150 may increase write throughput. A (e.g., each) fragment may include data pages 144 that were updated and data pages 144 that were not updated, which may increase the overall amount of data transferred to data storage 150.

Read and write activity for data pages 144 in data cache 140 may be tracked, for example, by a set of in-memory bitmaps (e.g., with one bit per page per bitmap). The WB process (e.g., background thread) may use the bitmaps to identify page updates in (e.g., 1 MB) fragments, and to detect concurrent writes of log records to the fragments in data cache 142 that the WB process may be currently reading from data cache 142 to write to data file(s) 152 in data storage 150. The bitmaps may support optimistic concurrency control. A WB process (e.g., background thread) may not interfere with writes. A WB process (e.g., background thread) may (e.g., instead) retry a read, for example, if a conflict is detected (e.g., based on the bitmaps), which may minimize the impact on performance of concurrent writers.

The bitmaps may be lost during a process restart. The bitmaps may be reconstructed at recovery time, for example, by rescanning a portion of one or more transaction logs, e.g., including updates that were applied to data pages 144 in data cache 142 but not yet persisted in data file(s) 152 in data storage 150. Log records for recovery may be tracked and identified, for example, using metadata, which may be used to track the progress of the database checkpoint in data cache 142 (e.g., local LSN) and WB iteration/checkpoint in data storage 150 (e.g., remote LSN). The metadata may be persisted durably, for example, using memory-optimized tables.

Write-behind optimization of data cache 142 may improve the performance and reliability of write workloads and/or may reduce the fragmentation of remote files. Write-behind may be implemented, for example, creating an additional layer that interacts with data storage 150 with minimal to no changes in the layers above data cache 142 (e.g., storage/IO subsystem in the database engine).

Write-behind optimization and optimistic concurrency control of storage-covering cache may improve database performance. Non-volatile (NV) data cache (e.g., resilient SSD cache) 142 may include a full copy of one or more data files 152. Data cache 142 may (e.g., therefore) support improved performance with reduced I/O operations using aggregate (e.g., fixed or variable block size) writes of contiguous data pages 144 (e.g., 1 MB blocks of clean and dirty pages) to one or more data files 152 in data storage 150. In contrast, in-memory cache (e.g., buffer pool) 114 may not include a full copy of one or more data files 152, which may not support I/O reduction with large writes of contiguous data pages 144 to one or more data files 152 in data storage 150. Performing write-behind operations in a background process with optimistic concurrency control (e.g., using bitmaps) may support improved database performance, for example, by not interfering with write operations to data cache 142. In contrast, a buffer pool may be synchronized with a concurrent workload, for example, due to page modifications done during a write (e.g., encryption, checksum).

Write-behind may optimize a tiered storage system (e.g., a fast NVM that serves the workload and slower long-term storage maintained in the background). In examples, an online transaction processing (OLTP) workload against a database with remote storage operation similar to FIG. 2 may indicate, for example, that random in-place updates lead to an I/O per second (IOPS) bottleneck for storage (e.g., at 500 TOPS). In an example of write-behind optimized operation similar to FIG. 3, a workload may reach maximum throughput (e.g., 60 MB/s throughput) without being restricted by TOPS.

Snapshot backups may be used in large databases, for example, to eliminate the size-of-data aspect of taking and restoring traditional backups. Write-behind optimization (e.g., of a NV covering cache) may reduce the cost of snapshot-based backups, for example, by reducing data file (e.g., BLOB) fragmentation and/or may reduce the amount of metadata utilized during copy-on-write operations.

Write-behind optimization of a covering cache may provide resiliency. A WB-optimized covering cache (e.g., SSD) may cache an unlimited number of accumulated writes. In contrast, a partially covering memory cache may not indefinitely accumulate writes. A WB-optimized covering cache may wait for/determine optimal times to write to storage without being restricted by memory resources. This allows a (e.g., database) system to function without interruption during an extended unavailability of (e.g., remote) storage.

Write-behind optimization of a covering cache may support re-creation of a data file (e.g., BLOB) using the contents of data cache, for example, in scenarios where (e.g., remote) storage is not recoverable.

Log receiver 160 may be implemented, for example, within primary compute node(s) 116 and/or stand-alone device(s). Log receiver 160 may comprise one or more virtual machines, storage devices, servers, operating systems, applications, services, local processes, remote machines, web services, etc. that may be executed, hosted, and/or stored therein or via one or more other computing devices (e.g., via network(s)). Log receiver 160 may represent any number of computing devices. Log receiver 160 may each be any type of stationary or mobile computing device, or a stationary computing device such as a desktop computer or PC (personal computer), or a server.

Log receiver 160 is configured to receive logs 182 from primary compute node(s) 116. Log receiver 160 may store a portion of received logs (e.g., the most recently created logs) 162. Log receiver 160 may provide logs 188 to log storage 170. Log receiver 160 may provide logs 184 to log service 120.

Logs (e.g., transaction logs indicating one or more database change records or transaction records) may be grouped into blocks for performance bundling reasons. A (e.g., each) log record in a log may include a description of a change in a database (e.g., a change in a particular data page). There may be multiple log records in a log. A data page may be a payload of customer data. A log record may describe insertion of information into a data page (e.g., table), an update (e.g., a change in a value of data, such as a change in a row of a table), deletion of data (e.g., deletion of a row in a table). Multiple changes to a data page of a customer's data may be bundled or grouped into a block. A block may detail multiple changes based on several mutation/modification queries (e.g., for updates, insertions, deletions). The size of a log block may vary and/or may have a maximum size, such as, for example, 60 kb. Each change record may be relatively small. For example, a deletion record may include a key and a small amount of data to allow a database engine to look up a row and bytes key. A change record for an insert may store an image of what's being inserted (e.g., a row name, age, address). An update may include a pre-update image and a post-update image. A larger row may be segmented to minimize record size. A single change may be segmented into multiple blocks. Database binary large object (BLOB)s may be cut into smaller chunks. Arbitrary sizes may exceed size limitations, so an arbitrary size payload may be segmented into smaller chunks.

Log storage 170 may comprise one or more virtual machines, storage devices, servers, operating systems, applications, services, local processes, remote machines, web services, etc. that may be executed, hosted, and/or stored therein or via one or more other computing devices (e.g., via network(s)). Log storage 170 may represent any number of computing devices. Log storage 170 may each be any type of stationary or mobile computing device, or a stationary computing device such as a desktop computer or PC (personal computer), or a server.

Log storage 170 may comprise multiple tiers (e.g., a hierarchy) of storage. For example, log storage 170 may comprise logs stored in local cache (LC) and long term storage (LTS) in various devices with various storage devices. LTS may store all logs while LC may store a portion of all logs. Log storage 170 may comprise multiple devices distributed among multiple locations (e.g., data centers). Log storage 170 may receive logs 188 from log receiver 160. Log storage 170 may maintain (e.g., all) logs 172. Log storage 170 may provide logs 190 to log service 120 (e.g., logs that may not be available from log receiver 160). In some examples, LTS may be external to the database service (e.g., example database service 100). LTS may store logs as one or more BLOBs.

Log service 120 may comprise one or more virtual machines, storage devices, servers, operating systems, applications, services, local processes, remote machines, web services, etc. that may be executed, hosted, and/or stored therein or via one or more other computing devices (e.g., via network(s)). Log service 120 may represent any number of computing devices. Log service 120 may each be any type of stationary or mobile computing device, including a mobile computer or mobile computing or a stationary computing device such as a desktop computer or PC (personal computer), or a server.

Log service 120 is configured to support data maintenance in database system 100. Log service 120 serves logs to clients or customers, such as secondary compute node(s) 112 and data server(s) 142, which may use the logs to maintain up-to-date data in accordance with changes indicated in logs. Log service 120 may make a secondary copy of logs 172 (e.g., in a log service private store). Log cache 136 may cache logs from multiple log storage tiers (e.g., log receiver 160, LC and LTS). Log transactions (e.g., by primary compute node(s) 116) may be mirrored. For example, primary compute node(s) 116 may send a message (e.g., a network message over the network) to log service 120 with a copy of the transaction data written to log receiver 160 (e.g., a full payload of the transaction log). A message received by log service 120 may be a notification that primary compute node(s) 116 attempted to write the transaction data (e.g., information) to logs 162. Log service may optimistically cache the transaction data under an assumption that the write to logs 162 is likely to be successful. Log service may await further instruction (e.g., confirmation of successful write) from primary compute node(s) 116 before serving the transaction data to secondary compute node(s) 112 and/or data server(s) 140. Log service 120 may optimistically cache logs to avoid going to log receiver 160 or other log storage device to perform a read to obtain logs or a portion thereof. Log service 120 may store a copy of logs in a memory area (e.g., cache) associated with (e.g., controlled by) log service 120. Log blocks and write confirmations may accumulate. Confirmations may be based on a point in time, covering multiple transaction logs (e.g., rather than confirming one log at a time). Log service 120 may determine which blocks (e.g., cached logs) may be promoted (e.g., served to clients in response to requests for updates) based on write confirmations. Logs may be written again by log service 120 into LTS as a back-up location (e.g., to another location, possibly stored in a different form).

Further example operation of example database system 100 and/or components therein are discussed with reference to FIGS. 2-10.

B. Embodiments for Write-Behind Optimization of Covering Cache

Various file types and formats of data files are applicable to the present embodiments. In particular, the format of a suitable data file may be such that a dedicated page (e.g., the first page) can be used to store metadata. In one example, a file control block (FCB) may be a structure that represents a physical storage file (e.g., data or a log) in a database, and a global file header (GFH) may be a first page of a database file, which may include file metadata. This example is set forth for purposes of illustration, but is not intended to be limiting, as other file types and formats may be used in embodiments.

Data cache (e.g., a local on-disk cache) for data pages may comprise, for example, a resilient buffer pool extension (RBPEX). Data cache (e.g., for data pages), such as RBPEX, may include metadata persisted in memory optimized tables. Data cache (e.g., for data pages) may be resilient to process restart (e.g., in contrast a buffer pool in a database engine, such as an SQL engine). Storage may be an external storage service (e.g., cloud storage service). A write to a storage-hosted external file may be slow and/or unreliable. Data cache (e.g., for data pages) may act as a local data file cache, which may be used to improve (e.g., read) performance of a page server (PS).

Figure 2:
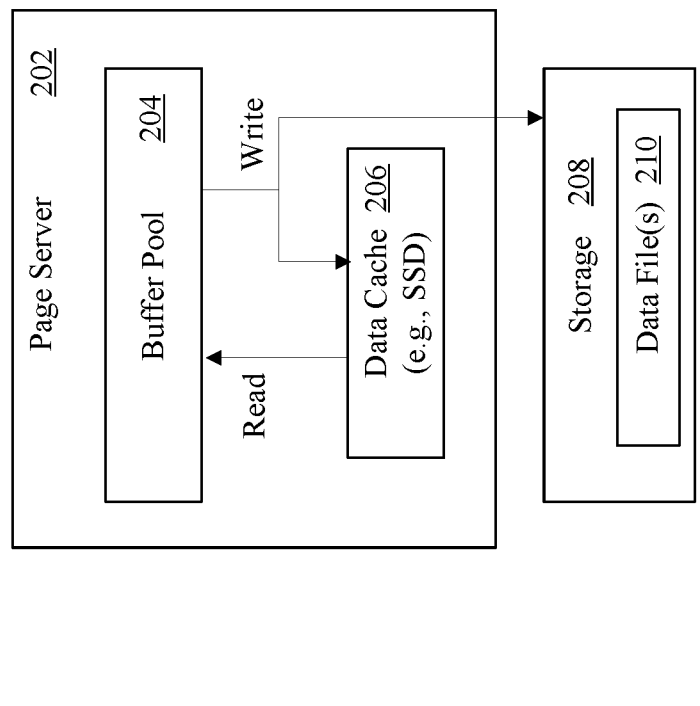
FIG. 2 illustrates an example of a concurrent write to local data cache and storage, according to an embodiment.

FIG. 2 illustrates an example of a concurrent write to local data cache and storage, according to an example embodiment. In particular, FIG. 2 shows an example database write system 200 that includes a page server 202 and storage 208. Page server 202 includes a buffer pool 204 and a data cache 206, and storage 208 stores one or more data file(s) 210. Database write system 300 is described in further detail as follows.

As shown by example database write procedure 200 in FIG. 2, a write I/O issued by a page server may be directed to data cache (e.g., SSD) and to an underlying FCB. Page server 202 may comprise in-memory buffer pool 204 and data cache 206. Data cache 206 may comprise NVM (e.g., SSD). Storage 208 may be external (e.g., to database system and service). Storage 208 may store data file(s) 210. A data file write from buffer pool 204 may be split and (e.g., concurrently) issued to both data cache 206 and storage 208 (e.g., to update data file(s) 210). A write I/O may not be completed until a storage write commits. A write to storage may be a bottleneck for page server (e.g., for redo performance). Page server (e.g., SQL server) 202 page size may be small (e.g., 8 kb). Writes to storage 208 may be fragmented. Thousands of writes to data file(s) 210 may be combined for a backup snapshot (e.g., stored by storage 208). Data file(s) 210 may comprise one or more BLOBs. The I/O performance for data file(s) 210 may degrade, for example, if storage 208 internally tracks and manages a significant amount of block metadata.

Figure 3:
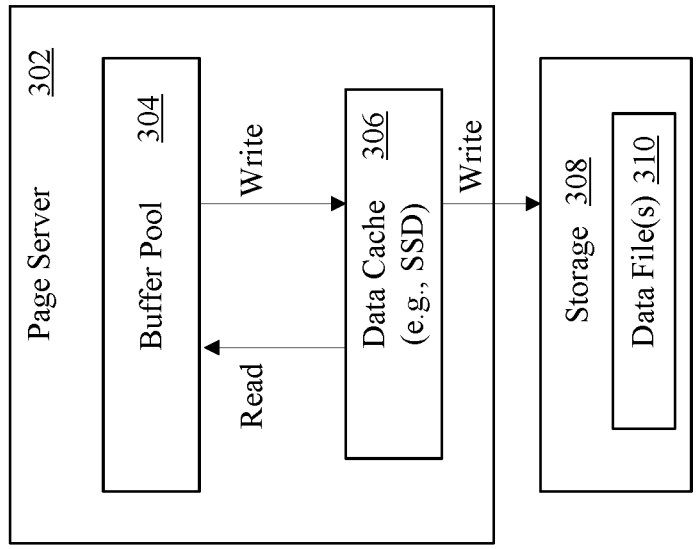
FIG. 3 illustrates an example of a write-behind optimization of data cache, according to an embodiment.

FIG. 3 illustrates an example of a write-behind optimization of data cache, according to an example embodiment. In particular, FIG. 3 shows an example database write system 300 that includes a page server 302 and storage 308. Page server 302 includes a buffer pool 304 and a data cache 306, and storage 308 stores one or more data file(s) 310. Database write system 300 is described in further detail as follows.

As shown by example database write system 300 in FIG. 3, an I/O path may go to data cache (e.g., SSD) but not to an underlying storage-based FCB, which may (e.g., instead) be written in a background process (e.g., in large block accumulated writes to reduce I/O operations). Page server 302 may comprise in-memory buffer pool 304 and data cache 306. Page server 302 provides an example of data server(s) 140 in FIG. 1. Data cache 306 may comprise NVM (e.g., SSD). Storage 308 may be external (e.g., to database system and service). Storage 308 may store data file(s) 310. Write-behind (WB) may be an enhancement to or optimization of data cache 306. Write I/O operations may be issued from buffer pool 304 to data cache 306. Write I/O operations to data cache (e.g., SSD) may not be forwarded to data files 310 (e.g., underlying storage BLOB(s)) in storage 308, for example, if/when write-behind for data cache (e.g., for data pages) is enabled. An in-memory buffer may (e.g., be used to) capture (e.g., all) the dirty bits tracking indicating which data pages in data cache 306 have been modified locally, e.g., ahead of the underlying data file 310 (e.g., BLOB). In some examples, data cache 306 may include (e.g., in addition to persisted data space) persisted and/or in-memory metadata (e.g., in one or more bitmaps), which may be used to manage the persisted data space and/or one or more background (e.g., secondary) processes. Data cache 306 may maintain in an in-memory buffer a dirty-page bitmap, for example, with a dirty bit indicator per page. For example, a dirty page bit may be turned on for each page that has been written to data cache. Data pages in data cache 306 may change, for example, by applying log records in logs provided by log service 120. A secondary (e.g., background) process may use dirty bit information to (e.g., asynchronously) move data pages from data cache 306 into data file(s) 310.

Write-behind optimized data cache 306 may decouple writes, checkpoints, and/or recovery from (e.g., remote) storage 308. Decoupling data cache 306 from storage 308 may support, for example, page server 302 functionality during a storage outage, page server 302 functionality as a local data file, and/or reducing I/O operations by aggregating writes (e.g., into a larger I/O sizes) to storage 308.

Page server 302 may exhibit remote storage resiliency. For example, page server 302 may continue operating (e.g., indefinitely) if/when an underlying storage account (e.g., when a storage account is used, such as in Microsoft® Azure®) to access storage 308 is unavailable.

Page server 302 may not fall behind, for example, if the write latency for page server 302 is not dictated by an underlying storage file (e.g., BLOB). Write latency may be (e.g., exclusively) controlled by a data cache 306 (e.g., a local SSD), for example, if (e.g., all) write I/O operations land in data cache 306 (e.g., a local SSD). Decoupling data cache 306 from storage may provide an efficient form of reverse seeding, e.g., an operation where data pages in data cache 306 may be copied back (e.g., wholesale) to data file(s) 310 (e.g., the underlying BLOB(s)).

Page server 302 may accumulate more and more dirty pages in data cache 306, for example, the longer storage 308 may be unavailable. The catchup rate of data file(s) 310 (e.g., the storage BLOB(s)) from data cache 306 (e.g., when storage 308 becomes available again) may improve with WB optimization, for example, because (e.g., at catchup time) the probability of finding adjacent dirty pages increases and/or because I/O operations may be for large, contiguous blocks, which may (e.g., also) reduce fragmentation of data files(s) 310.

The performance of a database with WB optimized cache may vary. Data cache may function with and without (e.g., selectable) data cache WB. Data cache WB may operate with a covered and a partially covered data cache. A page server may function with a storage outage. In some examples, a page server redo may achieve a 100 MB/S log rate with a Transaction Processing Performance Council-Type C (TPC-C) type of workload. Data cache WB may support multiple page servers on a (e.g., one) database instance. Data cache WB may support a storage++ striped file. Data cache WB may support single slice or multiple slices. Data cache WB may improve page server snapshot throttling. Compute log generation may be throttled, for example, if/when WB checkpointing is falling behind/lagging. Database (DB) restorability may not be impacted by data cache WB.

Data cache (e.g., SSD) may implement (e.g., in metadata) a per-database repository of checkpoint-related information. Logs may have log sequence numbers (LSNs), which may be applied to the checkpoint-related information. Data page cache-level apply information (CAI) may store (e.g., all) checkpoint related information (e.g., redo LSN, redo time, and/or the like), which may be hosted in a global file header (GFH). A page server checkpoint may save a most recently applied and persisted LSN and related information in cache metadata (e.g., instead of writing directly to a storage file). A CAI may provide a checkpoint LSN (e.g., as far as the page server checkpoint is concerned).

A (e.g., background) worker thread (e.g., a write-behind checkpoint) may (e.g., periodically) scan the dirty page bitmap and move (e.g., all) pages that have been dirtied from data page cache to the underlying storage BLOB. The CAI may be propagated to the GFH, for example, based on (e.g., upon) completion of a full pass through the dirty page bitmap. The remote checkpoint information may (e.g., thereby) be moved forward.

Figure 4:
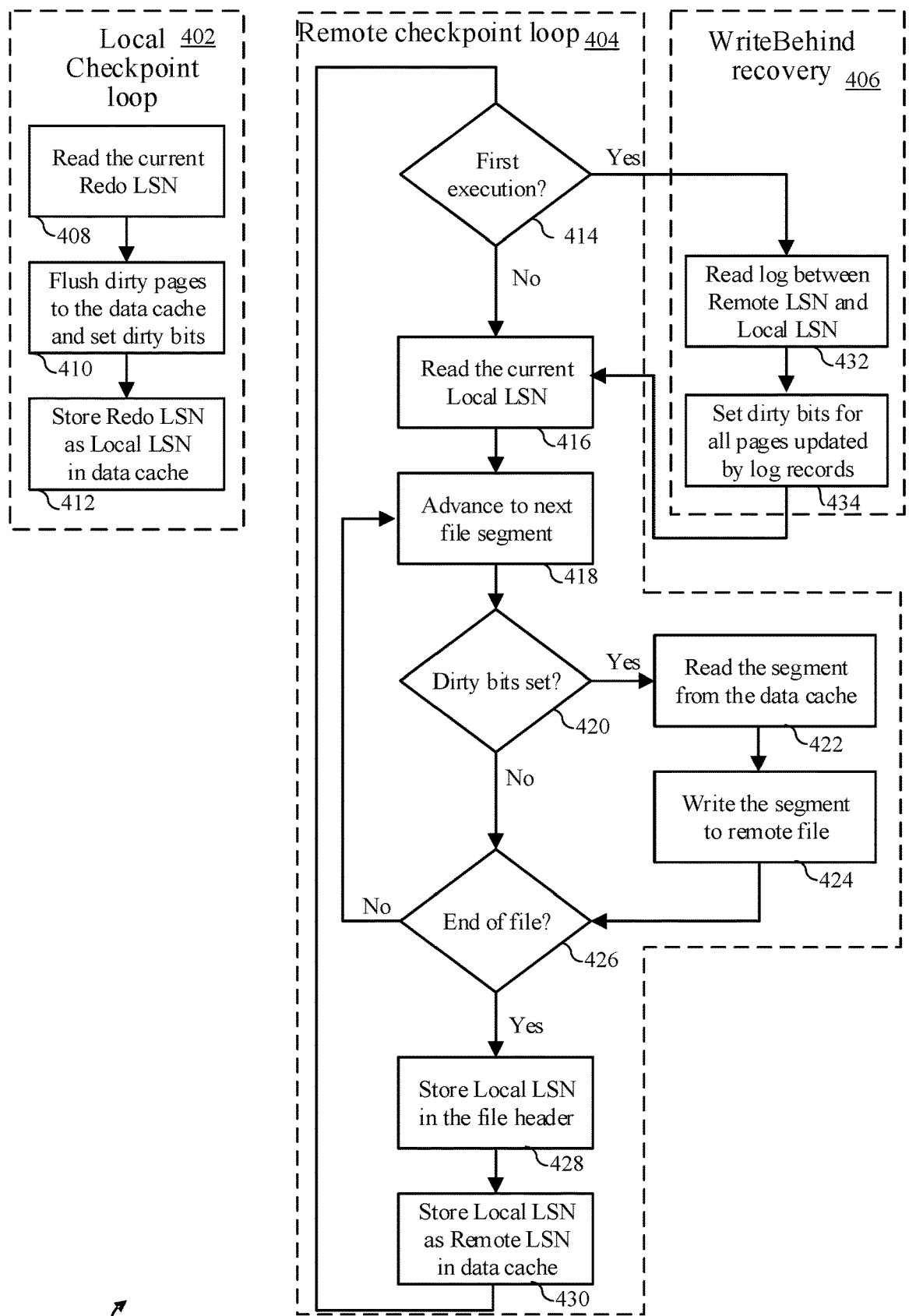
FIG. 4 shows a flowchart of a write-behind checkpoint procedure, according to an example embodiment.

FIG. 4 illustrates a flowchart 400 of an example of a write-behind checkpoint procedure, according to an example embodiment. The procedure of illustrated by flowchart 400 includes several examples, including local checkpoint loop procedure 402, remote checkpoint loop procedure 404 and write-behind recovery procedure 406.

As shown in example local checkpoint loop procedure 402, at 408, the current redo LSN (e.g., maintained by a page server) may be read. At 410, dirty data pages may be flushed (e.g., from the in-memory buffer) to data cache. Dirty bits may be set for these pages (e.g., for a WB process). At 412, the local LSN in data cache may be set to the redo LSN. Local checkpoint loop procedure 402 may be (e.g., periodically or aperiodically) repeated.

As shown in example remote checkpoint loop procedure 404, at 414, a determination is made whether it is the first execution of remote checkpoint loop procedure 404. The remote checkpoint procedure may proceed to write-behind recovery procedure 406, for example, if it is the first execution of remote checkpoint loop procedure 404. The remote checkpoint procedure may proceed to 416, for example, if it is not the first execution of remote checkpoint loop procedure 404. At 416, the current local LSN (e.g., in data cache) may be read. At 418, remote checkpoint loop procedure 404 may advance to the next file segment. At 420, a determination is made whether dirty bits are set in the dirty page bitmap. The remote checkpoint procedure may proceed to 422, for example, if dirty bits are set. The remote checkpoint procedure may proceed to 426, for example, if dirty bits are not set.

At 422, a segment in data cache with one or more dirty bits set (e.g., a fixed block such as 1 MB with dirty and clean pages) may be read from data cache. At 424, the segment may be written to a (e.g., remote) data file (e.g., a BLOB) in storage. This write of the data segment from data cache (e.g., data cache 306 of FIG. 3) to storage (e.g., written as a data file to storage 308) is referred to as a write-behind (WB) storage write. In embodiments, the WB storage write asynchronously maintains data file(s) 310 in storage 308 by propagating changes received from buffer pool 304 (as "writes") to data segments in data cache 306 using a smaller number of larger I/O requests relative to buffer pool 204 of FIG. 2, which writes all changes to data segments, whether large or small, to both data cache 206 and storage 208. As such, higher levels of a database system (e.g., query service 110 of database system 100 of FIG. 1) are shielded from the latency issues and unreliability issues associated with remote I/O operations (e.g., I/O operations from data server(s) 140 (page servers) to data storage 150 in FIG. 1), which improves the performance of data write workloads by the processors of the page servers (e.g., faster log redo), and indirectly improves the performance of the compute nodes of query service 110 (e.g., by faster data reads from page servers).

At 426, a determination is made whether the end of the data file segments stored in data cache has been reached. The remote checkpoint procedure may return to 418, for example, if the end of the data file segments stored in data cache has not been reached. The remote checkpoint procedure may proceed to 428, for example, if the end of the data file segments stored in data cache has been reached. At 428, the local LSN in data cache may be stored in the file header (e.g., GFH) of the data file in storage. At 430, the local LSN may be stored in data cache as the storage or remote LSN.

As shown in example write-behind recovery procedure 406, at 432 (e.g., during the first execution of remote checkpoint loop procedure 404), the transaction log may be read between the remote LSN and local LSN (e.g., as may be indicated in data cache). At 434, dirty bits may be set for (e.g., all) data pages updated by log records. Write-behind recovery procedure 406 may (e.g., then) return to remote checkpoint loop procedure 404 at 416.

Figure 5:
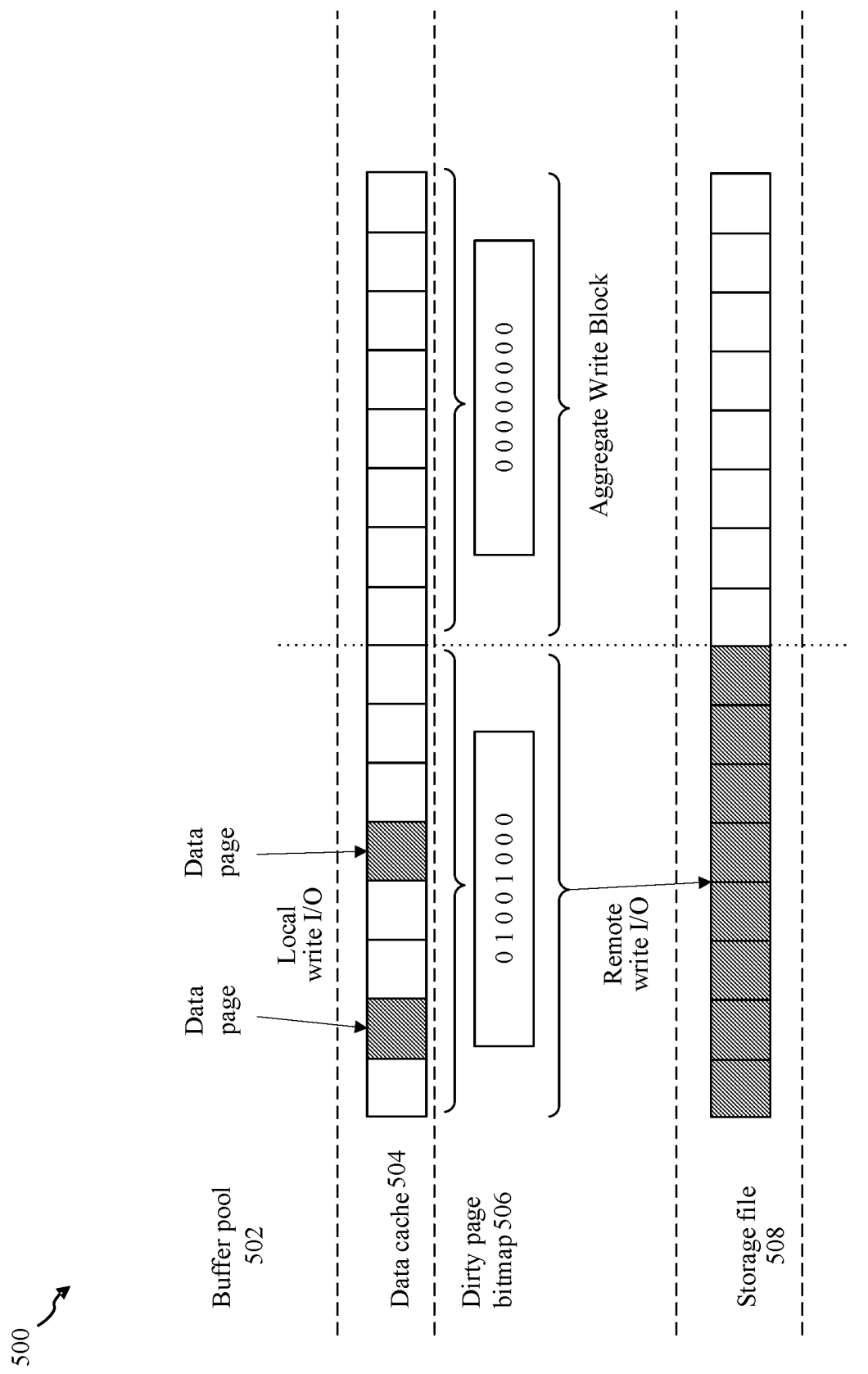
FIG. 5 illustrates an example of local and remote I/O with write-behind, according to an embodiment.

FIG. 5 illustrates an example data system 500 that illustrates local and remote I/O with write-behind, according to an example embodiment. In particular, data system 500 includes a buffer pool 502, a data cache 504, a dirty page bitmap 506, and a storage file 508. Data system 500 is described in further detail as follows.

As shown by data system 500 in FIG. 5, page server buffer pool 502 includes two data pages that were changed, for example, by application of log records to the data pages. The changed (e.g., dirty) data pages in buffer pool may be written to page server data cache 504 by local write I/O. An 8-bit dirty page bitmap example of dirty page bitmap 506 indicates the two dirty data pages stored in data cache 504 by one (1) bits (e.g., 01001000). In this example, aggregate write blocks are eight (8) data pages, but may be any amount of data (e.g., any number of data pages). A background process may read the dirty page bitmap 506 for each segment (e.g., block of data or number of pages), in this example an 8-page block of data, to determine whether to perform a (e.g., remote) write I/O operation for the data segment. Two 8-page segments are shown in data system 500, where the first 8-page segment includes two dirty pages and the second 8-page segment shows zero 8-page segments. As shown by example in FIG. 5, a background process may perform a (e.g., remote) write I/O operation to read the first 8-bit segment from the data cache 504 and write the first 8-page segment to storage file 508, including the two (2) dirty pages and six (6) clean pages. The background process may skip performing a (e.g., remote) write I/O operation for the second 8-page segment without any dirty pages. The remote I/O operation may read dirty pages to be uploaded to storage from data cache 504 (e.g., SSD) or buffer pool 502. A dirty page from buffer pool 502 may be dirty again (e.g., the page in buffer pool 502 may be ahead of its version in data cache 504). A dirty page in buffer pool 502 may be acceptable, for example, if LSN information associated with the dirty page in buffer pool 502 indicates (e.g., to a future consumer) which change logs need to be applied before using the dirty page in the buffer pool 502.

Checkpointing and recovery may be implemented in a write-behind optimized system. A page server process may use checkpoint information saved in CAI and in a storage file to re-create the content of a dirty-page bitmap before a crash. A page server process may, e.g., for a recovery, perform a log redo for (e.g., all) log records that are newer than the LSN saved in CAI (e.g., log records that are between the storage checkpoint LSN and the data cache checkpoint LSN).

Figure 6:
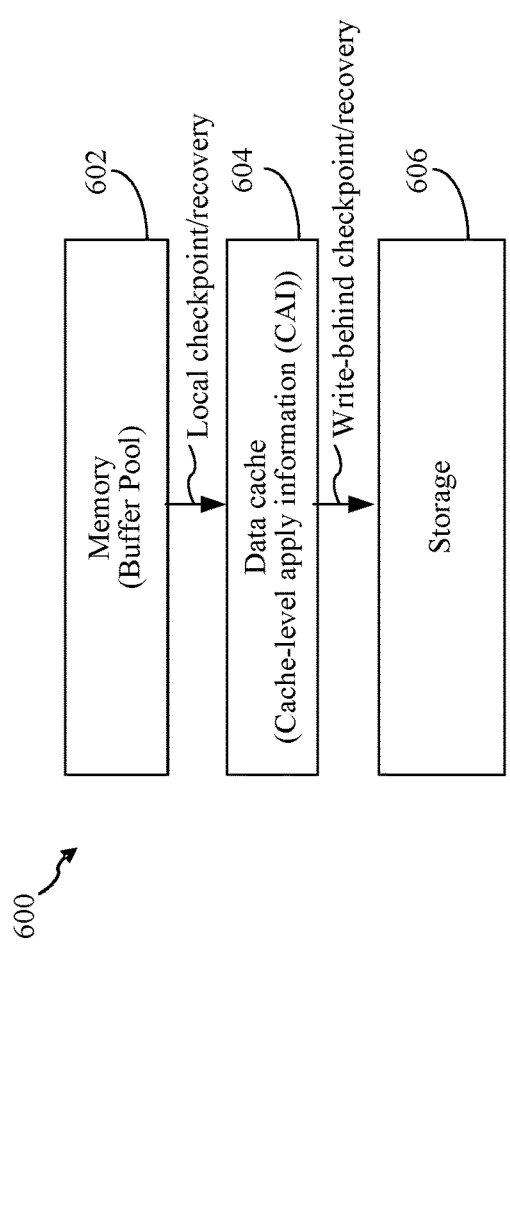
FIG. 6 shows a flow of an example of an independent crash and recovery process for decoupled write-behind data cache, according to an embodiment.

FIG. 6 shows a flow 600 illustrating an example of an independent crash and recovery process for decoupled write-behind data cache, according to an example embodiment. The example checkpoint and recovery process of flow 600 shows local checkpoint/recovery and remote or write-behind checkpoint/recovery. As shown in FIG. 6, local checkpointing and recovery may occur between memory 602 (e.g., random access memory) and data cache 604 (e.g., SSD) while remote or WB checkpointing and recovery may occur between data cache 604 and storage 606 (e.g., storage disk).

Data cache level apply information (CAI) may be stored on a per database basis in data cache metadata. Multiple (e.g., two) copies of CAI information may be stored. A first copy may include the remote (e.g., storage) CAI values in GFH. A second copy may include the local (e.g., cache) CAI values.

I/O issued by a checkpoint to flush pages may be decoupled from data cache I/O. A dirty page bitmap may be used in a data cache I/O path (e.g., RBPEX I/O) to track pages written to the data cache but not yet flushed to remote storage.

A (e.g., dedicated) write-behind thread may be used for a (e.g., each) database. The write-behind thread may start, for example, if/when the database starts. The write-behind thread may be stopped, for example, when the database shuts down. The thread may wake up (e.g., periodically) to take a checkpoint.

The (e.g., dedicated) write-behind (WB) thread may move dirty pages between data cache and storage. A thread may read (e.g., start by reading) the CAI, scan the dirty page bitmap, and extract data (e.g., data pages) for a (e.g., one) subset of bits in the dirty page bitmap at a time, for example, for movement between data cache and storage. In some examples, the WB thread may read (e.g., latch) the pages identified by the subset of bits. The thread may send the corresponding pages to storage (e.g., in chunks, such as 1 MB chunks at a time). In some examples, a write-behind thread may (e.g., alternatively) rely on bitmaps (e.g., instead of latches) for concurrency, for example, to detect read-write conflicts (e.g., for improved performance).

A subset of dirty page bits being written may be merged back into a dirty page bitmap, for example, based on (e.g., upon) a (e.g., remote) FCB I/O error. A subset of dirty page bits may (e.g., already) be cleaned, for example, based on success.

A checkpoint may be completed, for example, by persisting the applied metadata. The CAI local metadata may be written, for example, to the GFH hosted in storage and to the remote CAI.

Figure 7:
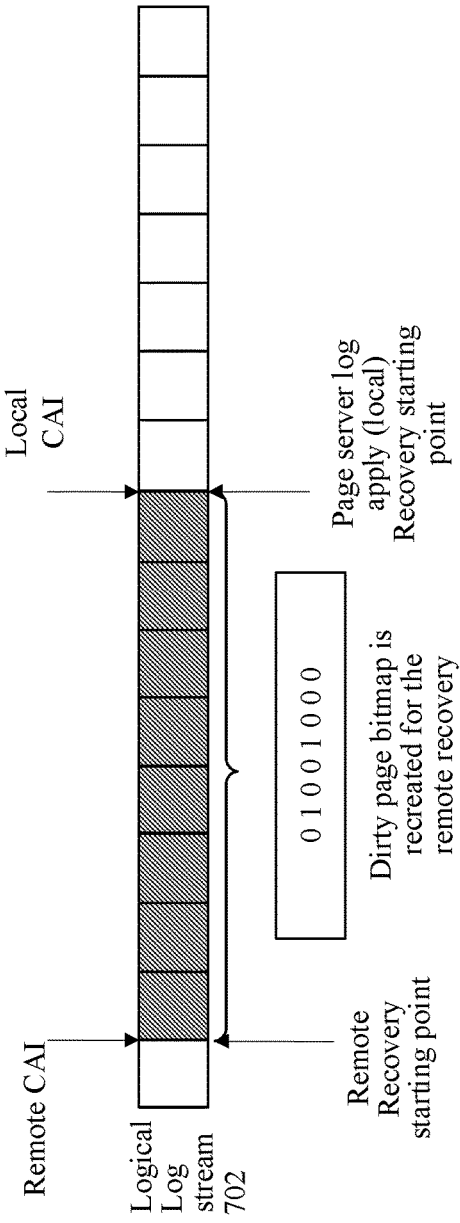
FIG. 7 illustrates an example of a data cache write-behind recovery starting point, according to an embodiment.

FIG. 7 illustrates an example of a data cache write-behind recovery system 700 starting point, according to an embodiment. Recovery system 700 includes a logical transaction log stream 702. Checkpoint and recovery of a database file may be decoupled into local data cache (e.g., RBPEX) and write-behind data cache (e.g., RBPEX), which may run independently and/or concurrently. A local data cache recovery may load the redo information from CAI and may start a redo from local metadata. Write-behind data cache recovery may not be aware which pages have been flushed to remote storage. A new log scan may start at the remote CAI and may iterate over the transaction log until reaching the local CAI (e.g., to rebuild the dirty page map). The bits (e.g., all the bits) in the dirty page bitmap corresponding to log records in the range may be set. The log may not be applied to pages in the local data cache, for example, because data cache may have already been updated for the log range. The page server log redo may use the local CAI (e.g., instead of a remote CAI), for example, to determine where to start applying a log to a current page server (PS).

In some examples, a data cache transaction log apply thread may not be blocked from processing logs (e.g., writing data pages in data cache) while the background checkpoint thread is writing modified data pages to storage. A checkpoint thread may be prevented from issuing (e.g., 1 MB) I/Os (e.g., as there is less chance of obtaining latches on a block of pages, such as 128 pages, at the same time), for example, if a checkpoint thread is unable to successfully latch a page, such as if/when data cache log apply is holding a latch. A current checkpoint cycle may not complete successfully, which may delay remote checkpoints on storage. Optimistic concurrency control may reduce or avoid such issues. I/Os may be issued without latches. Failed read I/O may be retried based on (e.g., upon) detecting a (e.g., any kind of) conflict.

A lock or latch may (e.g., be used to) prevent torn reads from data cache during a write-behind checkpoint, for example, while a data cache log apply thread is processing logs and issuing writes to local cache. Protection may be provided (e.g., implemented) using multiple (e.g., three) bitmaps. Bitmaps may have protection indicated by, for example, one bit per page (e.g., as shown by example in FIG. 8).

Figure 8:
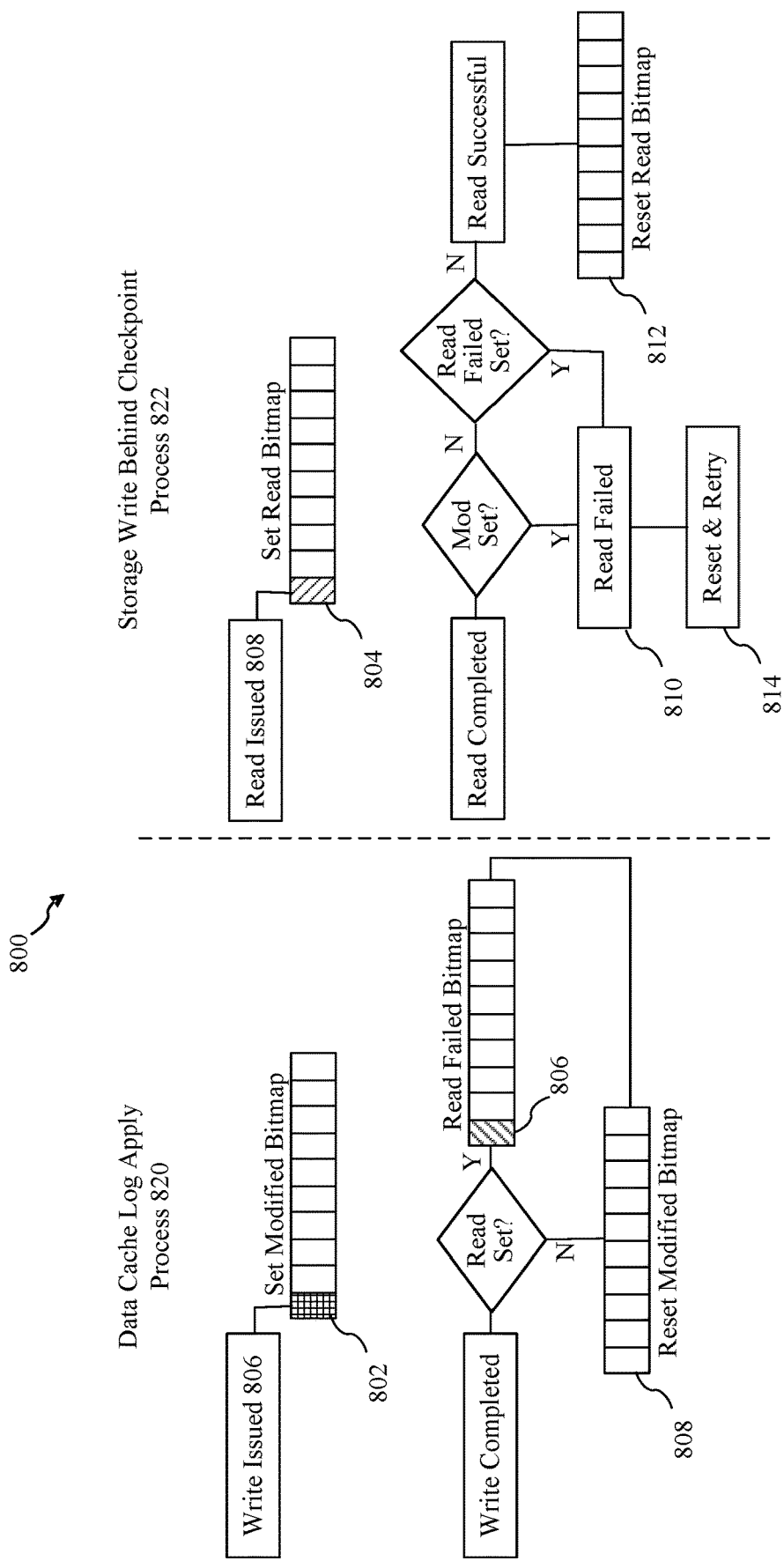
FIG. 8 illustrates a process of an example of read/write concurrency control using bitmaps, according to an embodiment.

FIG. 8 illustrates an example process 800 of read/write concurrency control using bitmaps, according to an example embodiment. Concurrency control process 800 includes a data cache log apply process 820 (illustrated on the left side of FIG. 8) and a storage WB checkpoint process 822 (illustrated on the right side of FIG. 8). Data cache log apply process 820 and storage WB checkpoint process 822 may run concurrently. According to process 800, a page (e.g., corresponding to a first bit in the bitmap) may undergo a "write" (e.g., in a data cache log apply process) and a "read" (e.g., in a WB checkpoint process), which may end up in conflict.

As shown in FIG. 8, at 802 (e.g., during a data cache log apply process), a modified bitmap (BMP) may be set (e.g., to 1) per data page (e.g., a "cache write bit" per data page) before a write is issued to data cache and reset at 808 (e.g., to 0) based on (e.g., upon) write completion.

As shown in FIG. 8, at 804 (e.g., during a storage WB checkpoint process), a read bit (or "cache read bit", or "data cache read bit") in a read bitmap may be set (e.g., per page) before a read is issued from data (e.g., SSD) cache by background write-behind checkpoint thread. A read bit may be reset, at 812 after read completion.

A read (e.g., any read) issued (e.g., in a storage WB checkpoint process) that occurs between the set/reset modified bitmap points in the data cache log apply process (e.g., a read occurring between a write issued to SSD cache at 802 and a reset in write completion in the data cache log apply process at 808) may be considered failed, at 810, which may lead to, at 814, a read reset and retry in the WB checkpoint process.

As shown in FIG. 8, at 806, a read failed (or "read fail", or "cache read fail") bit in a read failed bitmap may be set for a page, for example, if a writer finds a read bit set (e.g., at 804) for the page it has completed writing. A read failed bit may be set to communicate with the reader in a storage WB checkpoint process (e.g., after its read has completed) that the page was concurrently being written in the data cache log apply process while the read was in progress. The reader may, at 810, detect the read failed bit and, at 814, reset and retry read on the same page after resetting necessary bits.

A read retry (e.g., all read retries) may occur within a current checkpoint cycle. During retry, a read may be issued (e.g., only) on pages with a concurrency conflict. An I/O operation (e.g., a segment or block read) may be reconstructed to be written to (e.g., external) storage. The probability of hitting a conflict in a short duration may be low, which may increase the possibility of a successful read with retry.

Page server redo checkpointing and recovery may occur. A page server may use a (e.g., an SQL) database checkpointing mechanism to flush dirty pages (e.g., from a buffer pool) to the data file(s) (e.g., BLOBs) hosted in storage. Redo information (e.g., a redo LSN) may be persisted (e.g., at checkpoint completion), for example, in the GFH in storage. The redo information may be loaded back from the GFH, for example, during a page server recovery. The page server redo may restart from the last checkpoint position.

Separation may be provided between local checkpointing (e.g., flushing the buffer pool dirty pages to data cache (RBPEX)) and remote checkpointing (e.g., writing out data cache (RBPEX) updates into remote storage). Local checkpointing may direct (e.g., redirect) its update of redo information to CAI, which may be saved locally.

During a page server recovery, a redo may reload checkpoint information (e.g., checkpoint LSN) from CAI and restart the redo from that point on.

A completed write-behind checkpoint cycle may occur. A WB checkpoint thread may successfully complete a full scan and flush dirty pages. The WB checkpoint may be completed, for example, by updating and persisting a (e.g., remote) storage GFH and remote state (e.g., storage or remote CAI) checkpoint metadata with the last checkpointed redo information tracked in a local state (e.g., data cache or local CAI).

A snapshot of values stored in the local state (e.g., local CAI) may be taken as part of a local data cache checkpoint. The snapshot may be used to (e.g., first) update GFH and flush it to a remote file. The remote state (e.g., remote CAI) may be updated, for example, (e.g., only) if GFH is updated and flushed to a remote file. This example order may guarantee the logic that local CAI>=GFH>=remote CAI. This assertion may drive a successful recovery cycle and avoid database corruption.

Write-behind recovery may occur. Recovery may be executed (e.g., first), for example, if/when a page server with write-behind enabled starts up. Write-behind recovery may use checkpoint metadata (e.g., local CAI LSN, remote CAI LSN) information, which may be stored in memory-optimized tables. Checkpoint LSN's stored in local state (e.g., local CAI) structures may track data cache checkpoints. Checkpoint LSNs stored in a remote state (e.g., remote CAI) structures may track a remote file checkpoint. Checkpoint LSNs stored in local state structures and remote state structures may be used to drive a successful checkpoint closing and recovery sequence.

Write-behind recovery may find any pages that were not flushed to the remote file before a page server crashed or restarted. Write-behind recovery may find pages that were not flushed, for example, by re-populating the write-behind bitmap with the pages, e.g., so that the next write-behind checkpoint cycle can pick up the pages and flush them to the remote storage file. Recovery may be executed, for example, based at least in part on the write-behind recovery procedure (e.g., of high-level steps) shown in FIG. 4.

As shown in FIG. 4, at 422, a log may be read (e.g., scanned) from between remote LSN (e.g., start LSN=remote CAI) and a local LSN (e.g., end LSN=local CAI). At 424, dirty bits may be set for (e.g., all) pages updated by log records. Log records between start and end LSNs may be fetched. For each fetched log record that includes a page update, the page identifier (ID) may be acquired/accessed and updated in the write-behind dirty page bitmap. Recovery may be (e.g., marked as) completed for the database and the WB checkpoint thread may proceed with its execution, for example, based on (e.g., successful) completion of write-behind recovery.

Backup may be implemented with a snapshot. Restore may use a page server snapshot set that is behind the Point-in-Time restore point, for example, to bring the page server forward to the requested restore state. The page server snapshots may be tagged with metadata on the storage file (e.g., BLOB) for a fast snapshot search. The metadata may express the snapshot state, for example, in terms of its reference in the log (e.g., redo LSN). The snapshot may receive a window of the redo LSN (e.g., instead of a precise point), for example, because the page server snapshot is independent of the log apply. The beginning of the window (e.g., begin redo LSN) may guarantee (e.g., all) the pages in the storage file are larger than the LSN. The end of the window may guarantee (e.g., all) the pages are less than the LSN. In some examples, LSNs may be integer values/identifiers written to the log stream in an increasing order. For example, if two updates to data pages are logged, the first update may have a lower LSN than the second update. If a page server redoes (e.g., all) log records up to LSN L1, and then completes a checkpoint (e.g., writes all pages to the file), then it may be known that any changes recorded in the log stream up to LSN L1 are durably persisted in a stored data file. As a result, a future recovery may start reading log from L1 forward.

The beginning of the snapshot window (e.g., for data cache write-behind) may be based on the remote CAI redo information, which may be saved locally. The remote CAI redo information may (e.g., be guaranteed to) be smaller than the remote GFH value. For example, the GFH may be flushed before the remote CAI is updated. The end of the window metadata may be provided in accordance with various implementations.

Write-behind may be enabled and disabled. Write-behind may be enabled from the start, for example, when data cache (e.g., SSD) is created. Enabling and/or disabling mechanisms may or may not be implemented on an existing data cache. Write-behind may be enabled on existing databases. Data cache may be preserved during a database (e.g., an SQL server) restart.

Enabling or disabling WriteBehind may be implemented by dropping and recreating data cache (e.g., SSD). This may incorporate adding or removing Local/Remote CAI to the cache metadata while recreating the data cache. The information in GFH may be used to provide initial values for the Local/Remote CAI during cache creation.

Alternatively, enabling or disabling WriteBehind may be implemented by extending the metadata of an existing cache with Local/Remote CAI.

C. Further Operational Embodiments

Implementations are not limited to the examples described above. Example database system 100 or components therein, and/or other systems and components in other examples may further operate according to examples presented in FIG. 9.

Figure 9:
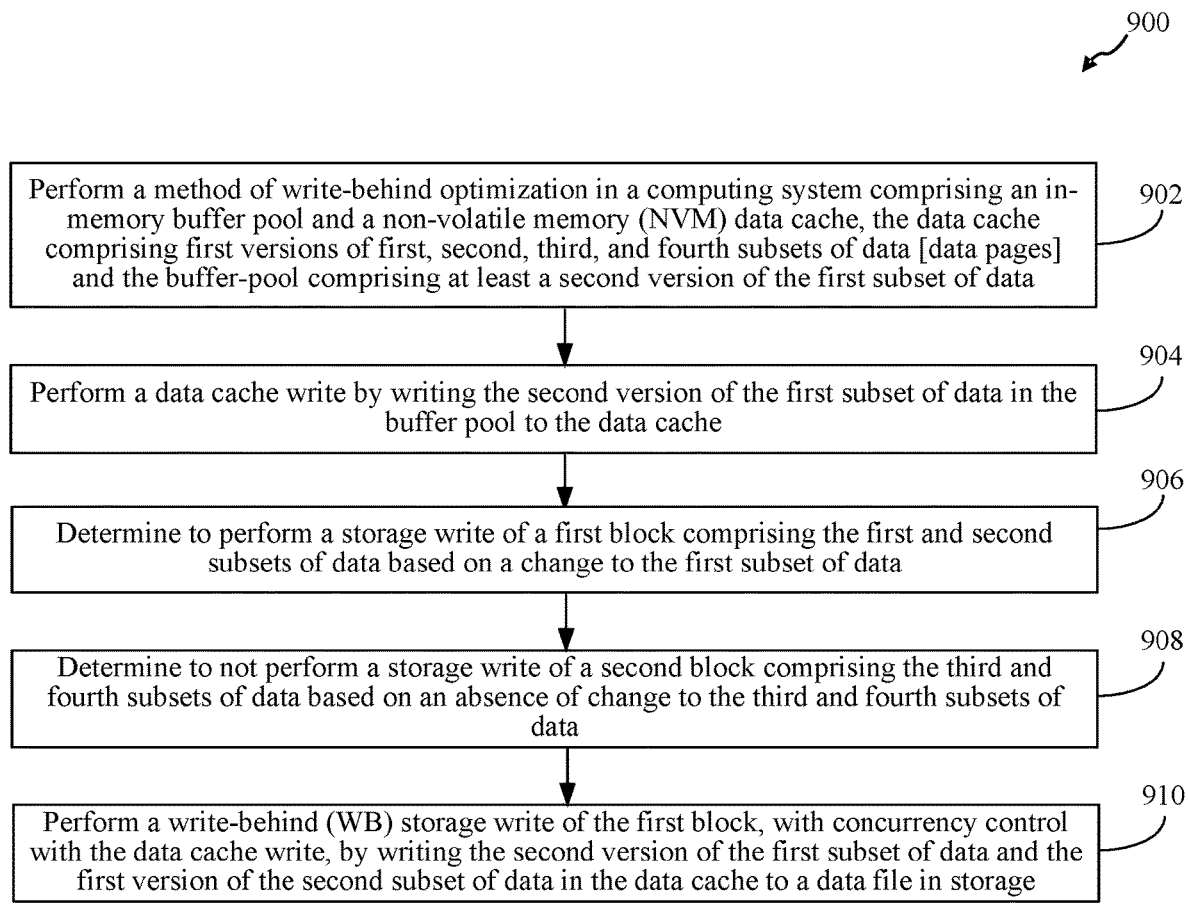
FIG. 9 shows a flowchart of an example method for write-behind optimization for covering cache in a database, according to an embodiment.

Embodiments for write-behind optimization of covering cache may operate in various ways. For example, FIG. 9 shows a flowchart 900 of a method for write-behind optimization of covering cache, according to an embodiment. Flowchart 900 comprises steps 902-910. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 9. FIG. 9 is simply one of many possible embodiments. Embodiments may implement fewer, more or different steps.

With reference to flowchart 900 in FIG. 9, in step 902, a method of write-behind optimization may be performed in a computing system comprising an in-memory buffer pool and a non-volatile memory (NVM) data cache. The data cache may comprise first versions of first, second, third, and fourth subsets of data (e.g., data pages). The buffer pool may comprise at least a second version of the first subset of data that is a change to the first subset of data relative to the first version. For example, as shown in FIG. 1, a data server 140 may be a computing system (e.g., as discussed by reference in FIG. 10). As shown in FIG. 3, data server 140 (e.g., page server 302) may comprise buffer pool 304 and data cache 306. As shown in FIG. 5, the buffer pool and data cache may comprise multiple data segments (e.g., data pages).

In step 904, a data cache write may be performed by writing the second version of the first subset of data in the buffer pool to the data cache. For example, as shown in FIG. 5, two data pages in the buffer pool changed by application of log records are written the data cache.

In step 906, a determination may be made to perform a storage write of a first block comprising the first and second subsets of data based on the change to the first subset of data. For example, as shown in FIG. 4, a determination is made in remote checkpoint loop procedure 404, at 420, to write to storage the left or first block of eight data pages shown in FIG. 5, including two dirty pages and six clean pages, based on the two dirty pages.

In step 908, a determination may be made to not perform a storage write of a second block comprising the third and fourth subsets of data based on the absence of change to the third and fourth subsets of data. For example, as shown in FIG. 4, a determination is made in remote checkpoint loop procedure 404, at 420, to not write to storage the right or second block of eight data pages shown in FIG. 5, based on the absence of change to any of the eight data pages.

In step 910, a write-behind (WB) storage write of the first block may be performed, with concurrency control with the data cache write, by writing the second version of the first subset of data and the first version of the second subset of data in the data cache to a data file in storage. For example, as described above with respect to FIGS. 4, at 422 and 424, the left or first block of eight data pages shown in FIG. 5, including two dirty pages and six clean pages, are written to the storage file as a WB storage write with concurrency control with the data cache write (of step 904), thereby preventing interference with any subsequent writes to the left or first block of eight data pages in data cache.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
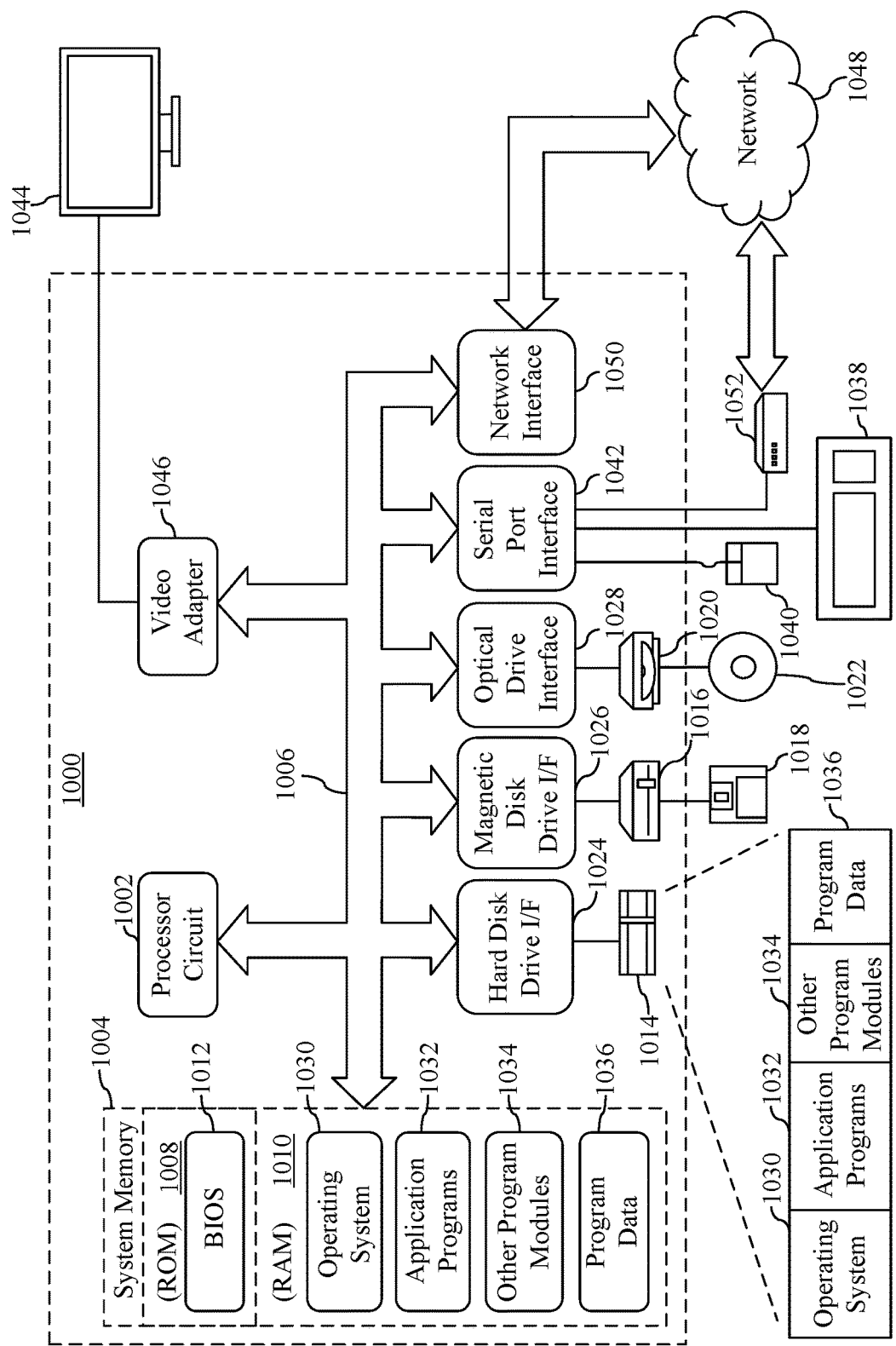
FIG. 10 shows a block diagram of an example computing device that may be used to implement example embodiments.

FIG. 10 shows an exemplary implementation of a computing device 1000 in which example embodiments may be implemented. Consistent with all other descriptions provided herein, the description of computing device 1000 is a non-limiting example for purposes of illustration. Example embodiments may be implemented in other types of computer systems, as would be known to persons skilled in the relevant art(s). Computing device 1000 may comprise an implementation of any one of query service 110, log service 120, data server(s) (e.g., page server(s)) 140, log receiver 160, log storage 170, and/or components or subcomponents shown or referred to in FIGS. 2-9 or discussion thereof.

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include computer program logic (e.g., computer program code or instructions) for implementing any of the components shown in FIGS. 1-9 or referred to in discussion thereof, such as query service 110, log service 120, data server(s) (e.g., page server(s)) 140, log receiver 160, log storage 170, and/or other components or subcomponents, and any of the operations (e.g., steps) shown in diagrams or flowcharts depicted in FIGS. 4-9.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of example embodiments described herein. Accordingly, such computer programs represent controllers of the computing device 1000.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

Methods, systems and computer program products are provided for write-behind optimization of covering cache (e.g., in a database). Write-behind optimization of covering cache may improve database performance. NVM data cache may include a full copy of stored data file(s). Data cache and storage writes, checkpoints, and recovery may be decoupled (e.g., with separate writes, checkpoints and recoveries). Covering data cache may support improved performance by supporting database operation during storage delays or outages and/or by supporting reduced I/O operations using aggregate writes of contiguous data pages (e.g., clean and dirty pages) to stored data file(s). Aggregate writes may reduce data file fragmentation and reduce the cost of storage operations such as snapshots or file copies. Performing write-behind operations in a background process with optimistic concurrency control may support improved database performance, for example, by not interfering with write operations to data cache. Data cache may store (e.g., in metadata) data cache checkpoint information and storage checkpoint information. A stored data file may store storage checkpoint information (e.g., in a file header).

In examples, a system for write-behind optimization of covering cache may comprise, for example, a data server comprising an in-memory buffer pool and a non-volatile memory (NVM) data cache, the data cache comprising first versions of first, second, third, and fourth subsets of data (e.g., data pages) and the buffer pool comprising at least a second version of the first subset of data that is a change to the first subset of data relative to the first version; one or more processors; and one or more memory devices that store program code configured to be executed by the one or more processors, the program code comprising a database service configured to: perform a data cache write by writing the second version of the first subset of data in the buffer pool to the data cache; determine to perform a storage write of a first block comprising the first and second subsets of data based on the change to the first subset of data; determine to not perform a storage write of a second block comprising the third and fourth subsets of data based on an absence of change to the third or fourth subsets of data; and perform a write-behind (WB) storage write of the first block, with concurrency control with the data cache write, by writing the second version of the first subset of data and the first version of the second subset of data in the data cache to a data file in storage.

In some examples, the database service may be (e.g., further) configured to: create the second version of the first subset of data in the buffer pool by applying a log record in a transaction log to a first version of the first subset of data in the buffer pool.

In some examples, the database service may be (e.g., further) configured to: create a data cache checkpoint by: reading a current redo transaction log sequence number (LSN); performing the data cache write by flushing dirty subsets of data comprising the first subset of data from the buffer pool to the data cache; and storing the current redo LSN as a cache checkpoint LSN in the data cache; and create a storage checkpoint by: reading the cache checkpoint LSN; performing the WB storage write of the first block by flushing dirty and clean subsets of data in the first block from the data cache to the data file in storage; storing the cache checkpoint LSN in a file header of the data file; and storing the cache checkpoint LSN as a storage checkpoint LSN in the data.

In some examples, the database service may be (e.g., further) configured to: perform WB recovery (e.g., during a database recovery) by: reading log records in any transaction log between the storage checkpoint LSN and the cache checkpoint LSN; and setting dirty bits for all subsets of data changed by the log records.

In some examples, the concurrency control may be optimistic concurrency control.

In some examples, the performance of the data cache write includes: setting a cache write bit for the first subset of data in a first bitmap; and setting a cache read fail bit if a cache read bit is set for the first subset of data during the data cache write; and the database service is further configured to: perform a concurrency control checkpoint process during the WB storage write of the first block at least in part by: setting a cache read bit for the first and second subsets of data in a second bitmap; determining that the WB storage write of the first block failed if the cache write bit or the read fail bit set by a writer is set for at least one of the first subset or the second subset of data during the WB storage write; and resetting the read bit for the first and second subsets of data and retrying the WB storage write.

In an alternative example, the performance of the data cache write includes: setting a cache write bit for the first subset of data in a first bitmap; and setting a cache read fail bit if a cache read bit is set for the first subset of data during the data cache write; and the database service is further configured to: perform a concurrency control checkpoint process during the WB storage write of the first block at least in part by: setting a cache read bit for the first and second subsets of data in a second bitmap; determining that the WB storage write of the first block failed if the cache write bit or the read fail bit set by a writer is set for at least one of the first subset or the second subset of data during the WB storage write; and resetting the read bit for the first and second subsets of data and retrying the WB storage write.

In some examples, the storage may be at least one of remote storage and append-only storage. In some examples, the data cache may be partially or fully covering cache. In some examples, the WB storage write may be performed in a background process independent of the data cache write.

In examples, a method for write-behind optimization of covering cache may be performed by a database service executing on at least one computing device. The method computing device or system may comprise an in-memory buffer pool and a non-volatile memory (NVM) data cache. The data cache may comprise first versions of first, second, third, and fourth subsets of data (e.g., data pages). The buffer pool may comprise at least a second version of the first subset of data that is a change to the first subset of data relative to the first version. The method may comprise, for example, performing a data cache write by writing the second version of the first subset of data in the buffer pool to the data cache; determining to perform a storage write of a first block comprising the first and second subsets of data based on the change to the first subset of data; determining to not perform a storage write of a second block comprising the third and fourth subsets of data based on an absence of change to the third and fourth subsets of data; and performing a write-behind (WB) storage write of the first block, with concurrency control with the data cache write, by writing the second version of the first subset of data and the first version of the second subset of data in the data cache to a data file in storage.

In some examples, a method may (e.g., further) comprise, for example, creating the second version of the first subset of data in the buffer pool by applying a log record in a transaction log to a first version of the first subset of data in the buffer pool.

In some examples, a method may (e.g., further) comprise, for example, creating a data cache checkpoint by: reading a current redo transaction log sequence number (LSN); performing the data cache write by flushing dirty subsets of data comprising the first subset of data from the buffer pool to the data cache; and storing the current redo LSN as a cache checkpoint LSN in the data cache; and creating a storage checkpoint by: reading the cache checkpoint LSN; performing the WB storage write of the first block by flushing dirty and clean subsets of data in the first block from the data cache to the data file in storage; storing the cache checkpoint LSN in a file header of the data file; and storing the cache checkpoint LSN as a storage checkpoint LSN in the data cache.

In some examples, a method may (e.g., further) comprise, for example, performing WB recovery (e.g., during a database recovery) by: reading log records in any transaction log between the storage checkpoint LSN and the cache checkpoint LSN; and setting dirty bits for all subsets of data changed by the log records.

In some examples, the concurrency control may be optimistic concurrency control.

In some examples, a method may (e.g., further) comprise, for example, performing the data cache write by: setting a cache write bit for the first subset of data in a first bitmap; and setting a cache read fail bit if a cache read bit is set for the first subset of data during the data cache write; and performing a concurrency control checkpoint process during the WB storage write of the first block at least in part by: setting a cache read bit for the first and second subsets of data in a second bitmap; determining that the WB storage write of the first block failed if the cache write bit or the read fail bit set by a writer is set for at least one of the first subset or the second subset of data during the WB storage write; and resetting the read bit for the first and second subsets of data and retrying the WB storage write.

In some examples, the storage may be at least one of remote storage and append-only storage.

In some examples, the data cache may be fully covering cache.

In some examples, the WB storage write may be performed in a background process independent of the data cache write.

In examples, a computer-readable storage medium may have program instructions recorded thereon that, when executed by a processing circuit, perform a method comprising: caching data pages in a stored data file in a fully covering cache; writing dirty data pages in a buffer pool to corresponding data pages in the data cache; operating a background write-behind (WB) process to propagate the dirty data pages in the data cache to the stored data file by writing aggregate blocks of contiguous data pages, including clean data pages and the dirty data pages, to the stored data file; and performing optimistic concurrency control so that the background write-behind process does not interfere with the writing of the dirty data pages in the buffer pool to the corresponding data pages in the data cache.

In some examples, a storage storing the stored data file may be at least one of remote storage and append-only storage.

In some examples, a method may (e.g., further) comprise, for example, creating a data cache checkpoint by storing a current redo log sequence number (LSN) as a cache checkpoint LSN in the data cache based on successfully writing the dirty data pages in the buffer pool to the corresponding data pages in the data cache; and creating a storage checkpoint by storing the cache checkpoint LSN in a file header of the stored data file and storing the cache checkpoint LSN as a storage checkpoint LSN in the data cache based on successfully propagating the dirty data pages in the data cache to the stored data file.

In some examples, a method may (e.g., further) comprise, for example, performing WB recovery by: reading log records in any data page transaction log between the storage checkpoint LSN and the cache checkpoint LSN; and setting dirty bits for all data pages changed by the log records.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system comprising:
a processor; and
a memory device storing program code configured to be executed by the processor, the program code comprising a database service configured to:
cache, in a data cache, subsets of data of a data file;
create a data cache checkpoint by storing a current redo log sequence number (LSN) as a cache checkpoint LSN in the data cache based at least on successfully performing a data cache write by flushing dirty subsets of data from a buffer pool to the data cache; and
create a storage checkpoint by storing the cache checkpoint LSN in a file header of the data file and storing the cache checkpoint LSN as a storage checkpoint LSN in the data cache based at least on successfully performing a write-behind (WB) storage write by flushing data segments comprising the dirty subsets of data from the data cache to the data file.

2. The system of claim 1, wherein the database service is further configured to:
perform a WB recovery by:
reading log records with LSNs between the storage checkpoint LSN and the cache checkpoint LSN; and
setting dirty bits for all subsets of data changed by the log records.

3. The system of claim 1, wherein flushing dirty subsets of data from a buffer pool to the data cache comprises, for each particular dirty subset of data:
setting a cache write bit associated with the particular dirty subset of data in a first bitmap;
writing the particular dirty subset of data to the data cache; and
setting a cache read fail bit associated with the particular dirty subset of data in a second bitmap if a cache read bit associated with the particular dirty subset of data is set in a third bitmap.

4. The system of claim 3, wherein flushing data segments comprising the dirty subsets of data from the data cache to the data file comprises, for each particular data segment:
setting a cache read bit for each subset of data contained by the particular data segment in the third bitmap;
determining that the WB storage write of the particular data segment failed based on a cache write bit in the first bitmap or a read fail bit in the second bitmap being set for at least one subset of data contained by the particular data segment during the WB storage write; and
resetting the cache read bit for each subset of data contained by the particular data segment and retrying the WB storage write for the particular data segment.

5. The system of claim 1, wherein the database service is further configured to:
perform concurrency control between the WB storage write and the data cache write.

6. The system of claim 5, wherein performing concurrency control comprises:
using a lock or latch to control concurrent access to the data cache; or
using a bitmap to perform optimistic concurrency control.

7. The system of claim 1, wherein:
the data file is stored in at least one of remote storage or append-only storage;
the data cache is fully covering cache; or
the WB storage write is performed in a background process independent of the data cache write.

8. A method comprising:
caching, in a data cache, subsets of data of a data file;
creating a data cache checkpoint by storing a current redo log sequence number (LSN) as a cache checkpoint LSN in the data cache based at least on successfully performing a data cache write by flushing dirty subsets of data from a buffer pool to the data cache; and
creating a storage checkpoint by storing the cache checkpoint LSN in a file header of the data file and storing the cache checkpoint LSN as a storage checkpoint LSN in the data cache based at least on successfully performing a write-behind (WB) storage write by flushing data segments comprising the dirty subsets of data from the data cache to the data file.

9. The method of claim 8, further comprising:
performing a WB recovery by:
reading log records in any transaction log between the storage checkpoint LSN and the cache checkpoint LSN; and
setting dirty bits for all subsets of data changed by the log records.

10. The method of claim 8, wherein flushing dirty subsets of data from a buffer pool to the data cache comprises, for each particular dirty subset of data:
setting a cache write bit associated with the particular dirty subset of data in a first bitmap;
writing the particular dirty subset of data to the data cache; and
setting a cache read fail bit associated with the particular dirty subset of data in a second bitmap if a cache read bit associated with the particular dirty subset of data is set in a third bitmap.

11. The method of claim 10, wherein flushing data segments comprising the dirty subsets of data from the data cache to the data file comprises, for each particular data segment:

setting a cache read bit for each subset of data contained by the particular data segment in the third bitmap;

determining that the WB storage write of the particular data segment failed based on a cache write bit in the first bitmap or a read fail bit in the second bitmap being set for at least one subset of data contained by the particular data segment during the WB storage write; and resetting the cache read bit for each subset of data contained by the particular data segment and retrying the WB storage write for the particular data segment.

12. The method of claim 8, further comprising:

performing concurrency control between the WB storage write and the data cache write by using a lock or latch to control concurrent access to the data cache or by using a bitmap to perform optimistic concurrency control.

13. The method of claim 8, wherein:

the data file is stored in at least one of remote storage or append-only storage; or the data cache is fully covering cache.

14. The method of claim 8, wherein the WB storage write is performed in a background process independent of the data cache write.

15. A computer-readable storage medium having program instructions recorded thereon that, when executed by a processing circuit, perform a method comprising:

caching, in a data cache, subsets of data of a data file;

creating a data cache checkpoint by storing a current redo log sequence number (LSN) as a cache checkpoint LSN in the data cache based at least on successfully performing a data cache write by flushing dirty subsets of data from a buffer pool to the data cache; and creating a storage checkpoint by storing the cache checkpoint LSN in a file header of the data file and storing the cache checkpoint LSN as a storage checkpoint LSN in the data cache based at least on successfully performing a write-behind (WB) storage write by flushing data segments comprising the dirty subsets of data from the data cache to the data file.

16. The computer-readable storage medium of claim 15, wherein the method further comprises:

performing a WB recovery by:

reading log records in any transaction log between the storage checkpoint LSN and the cache checkpoint LSN; and setting dirty bits for all subsets of data changed by the log records.

17. The computer-readable storage medium of claim 15, wherein flushing dirty subsets of data from a buffer pool to the data cache comprises, for each particular dirty subset of data:

setting a cache write bit associated with the particular dirty subset of data in a first bitmap;

writing the particular dirty subset of data to the data cache; and setting a cache read fail bit associated with the particular dirty subset of data in a second bitmap if a cache read bit associated with the particular dirty subset of data is set in a third bitmap.

18. The computer-readable storage medium of claim 17, wherein flushing data segments comprising the dirty subsets of data from the data cache to the data file comprises, for each particular data segment:

setting a cache read bit for each subset of data contained by the particular data segment in the third bitmap;

determining that the WB storage write of the particular data segment failed based on a cache write bit in the first bitmap or a read fail bit in the second bitmap being set for at least one subset of data contained by the particular data segment during the WB storage write; and resetting the cache read bit for each subset of data contained by the particular data segment and retrying the WB storage write for the particular data segment.

19. The computer-readable storage medium of claim 15, wherein the method further comprises:

performing concurrency control between the WB storage write and the data cache write by using a lock or latch to control concurrent access to the data cache or by using a bitmap to perform optimistic concurrency control.

20. The computer-readable storage medium of claim 15, wherein:

the data file is stored in at least one of remote storage or append-only storage;

the data cache is fully covering cache; or the WB storage write is performed in a background process independent of the data cache write.

* * * * *